United States Patent [19]

Hennig

[11] 3,860,942

[45] Jan. 14, 1975

[54] CONTAINER FOR PHOTOGRAPHIC ROLL FILM

[75] Inventor: Fridolin Hennig, Munich, Germany

[73] Assignee: Agfa-Gevaert Aktiengesellschaft, Leverkusen, Germany

[22] Filed: Jan. 22, 1974

[21] Appl. No.: 435,422

[30] Foreign Application Priority Data
Jan. 24, 1973 Germany............................. 2303269

[52] U.S. Cl. .............................................. 354/275
[51] Int. Cl. ........................................... G03g 19/04
[58] Field of Search.................... 354/275, 216, 277; 352/78 R, 78 C; 242/71.1, 71.7, 197; 96/76 C

[56] References Cited
UNITED STATES PATENTS

| 533,618 | 2/1895 | Stoelting............................ 354/216 |
| 3,581,641 | 6/1971 | Nerwin............................ 354/275 X |
| 3,675,992 | 7/1972 | Winkler et al.................. 354/275 X |

*Primary Examiner*—John M. Horan
*Attorney, Agent, or Firm*—Michael S. Striker

[57] ABSTRACT

A drop-in cassette for photographic roll film wherein the intermediate section which is located behind the film gate when the cassette is inserted into a camera body carries one or more elastic flaps which engage a first internal surface of the camera body to thereby urge an exposed surface of the intermediate section against another internal surface of the camera body and to thus insure that the cassette is maintained in an optimum position with respect to the film gate, with respect to the parts of the film transporting mechanism, and/or with respect to a feeler which bears against the front side of film in the intermediate section and penetrates into an oncoming perforation of the moving film during film transport to thereby initiate a termination of the film transport at the exact moment when the foremost unexposed film frame is in accurate register with the film gate. The flap or flaps may engage and be deformed by a portion of the camera body, by a portion of the movable cover of the camera body or by a portion of the film gate.

11 Claims, 6 Drawing Figures

PATENTED JAN 14 1975

CONTAINER FOR PHOTOGRAPHIC ROLL FILM

BACKGROUND OF THE INVENTION

The present invention relates to containers or cassettes for photographic roll film, and more particularly to improvements in film containers of the type known as drop-in cassettes wherein the unexposed portion of photographic roll film is stored in a first section and the exposed portion of film is stored in a second section of a suitably configured casing adapted to be inserted into a chamber provided therefor in the housing or body of a photographic apparatus, such as a still camera. Still more particularly, the invention relates to improvements in containers or cassettes of the type wherein the supply of photographic roll film is preferably provided with a row of perforations, one for each film frame. When the container is properly inserted into the chamber of a camera body, the film is engaged by a feeler which penetrates into an oncoming perforation during the transport of film whereby the penetration of feeler into such oncoming perforation initiates the termination of film transport at the exact moment when the foremost unexposed film frame is in accurate register with the film gate behind the picture taking lens.

It is already known to provide the casing of a container or cassette for photographic roll film with an intermediate section wherein a portion of film extends between the supply section and the takeup section and which is located behind the film gate when the container is properly inserted into a camera. The intermediate section is normally provided with two parallel exposed surfaces which are normal to the plane of film in the intermediate section and which should abut against complementary internal surfaces of the camera when the container is properly inserted into the chamber. This insures that the foremost unexposed film frame is in accurate register with the film gate as well as that the aforementioned feeler engages the film in the region of the row of perforations and can actually penetrate into an oncoming perforaton at the exact moment when or shortly before the foremost unexposed film frame registers with the gate. Accurate positioning of containers in the interior of a camera is of particular importance when the film is narrow and the dimensions of film frames are small, normally smaller than the frames of 35-millimeter film. The perforations of such narrow film are also very small so that the feeler of the camera must be in exact alignment with the row of perforations if the film transporting mechanism of the camera is to operate properly.

Attempts to insure proper positioning of containers for narrow photographic roll film in a camera include the provision of springs which are mounted in the interior of the camera body and serve to engage the casing of an inserted container so as to bias one or more selected exposed surfaces of the casing against one or more complementary internal surfaces of the camera body. As a rule, the spring or springs in the camera body engage one of two exposed surfaces which are normal to the plane of the film portion in the intermediate section of the casing and urge the other exposed surface against the adjacent internal surface in the camera body. Such spring or springs operate quite satisfactorily if they are actually provided in a camera body. However, since the maker of cassettes and of photographic roll film is not in a position to dictate that each and every maker of photographic apparatus install in the camera one or more springs serving the aforediscussed purpose, the purchaser of a camera without internal springs for the container or cassette is at a disadvantage because his camera cannot guarantee a proper positioning of the container therein. As a rule, the making of unsatisfactory exposures due to improper positioning and/or orientation of a container for photographic roll film in the camera body is attributed to the maker of containers and photographic film, rather than to the manufacturer of cameras. Therefore, the purchaser of a camera without springs for the film container is likely to discontinue buying that type of containers whose positioning in the camera necessitates the provision of springs or analogous positioning or orienting means.

SUMMARY OF THE INVENTION

An object of the invention is to provide a container or cassette for photographic roll film which is constructed and assembled in such a way that its casing can be properly located in the interior of a photographic apparatus irrespective of whether or not the apparatus is provided with special springs or analogous means for insuring a satisfactory positioning of the inserted container.

Another object of the invention is to provide a novel and improved casing for a container of the just outlined character.

A further object of the invention is to provide a container whose casing, when properly inserted into the chamber of a photographic apparatus, automatically insures accurate alignment of one or more feelers with one or more rows of film perforations in the interior of the inserted casing.

An additional object of the invention is to provide a container which is more versatile than heretofore known containers and wherein such greater versatility is achieved at a minimal cost and without contributing to the bulk and/or weight of the container.

Still another object of the invention is to provide a container which can be used as a superior substitute for presently known containers in existing photographic apparatus, irrespective of whether or not such apparatus embody resilient or analogous locating or positioning means for film containers.

An additional object of the invention is to provide a novel and improved intermediate section of the casing in a container for photographic roll film wherein the intermediate section connects a first section for convoluted unexposed film with a second section for convoluted exposed film.

A further object of the invention is to provide a container which can be properly positioned and oriented in still cameras or motion picture cameras whose chambers for containers are not dimensioned with a high degree of accuracy so that such dimensions may substantially exceed the dimensions which are necessary for accurate positioning of an inserted container without resorting to auxiliary positioning means.

The invention is embodied in a container or cassette for a supply of photographic roll film which is intended for use in photographic apparatus of the type having a chamber for reception of the container and bounded by a plurality of internal surfaces. The container comprises a casing which may consist of a suitable synthetic plastic material and includes a first section for storage of unexposed film and a second section for storage of exposed film whereby a portion of the supply of film extends between the two sections and is maintained in a predetermined plane, preferably by an intermediate section which is disposed between and connects the first and second sections to each other. The casing further comprises an exposed surface which is at least substantially normal to the aforementioned plane of film in the intermediate section, and the container further comprises one or more elastic portions or projections (e.g., in the form of flaps or the like) which engage and are deformed by one of the internal surfaces of a photographic apparatus whose chamber receives the casing to thereby urge the exposed surface of the casing against another internal surface of the photographic apparatus. This insures that the casing of the container is properly positioned in the chamber even if the photographic apparatus does not embody any springs or the like for biasing the inserted casing to a predetermined position and even if the dimensions of the chamber in a particular photographic apparatus substantially exceed those dimensions which would automatically insure an optimum positioning of the inserted container without resorting to auxiliary positioning means in the camera body.

The casing of the container is preferably provided with two substantially or exactly parallel outer sides, and the aforementioned exposed surface may form part of one of such outer sides or is parallel to one of the outer sides. The projection or projections may form integral parts of the casing, preferably of the intermediate section, and they may be designed to engage one or more internal surfaces which constitute the top and/or bottom faces of the film gate in the photographic apparatus.

In accordance with a more specific feature of the invention, the aforementioned exposed surface of the casing is preferably adjacent to that marginal portion of the film in the container which is provided with a row of perforations. This insures that, if the aforementioned feeler is properly postioned with respect to the other internal surface of the body of the photographic apparatus, it can automatically register with the row of perforations when the container is inserted into the chamber.

The novel features which are considered as characteristic of the invention are set forth in particular in the appended claims. The improved container itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
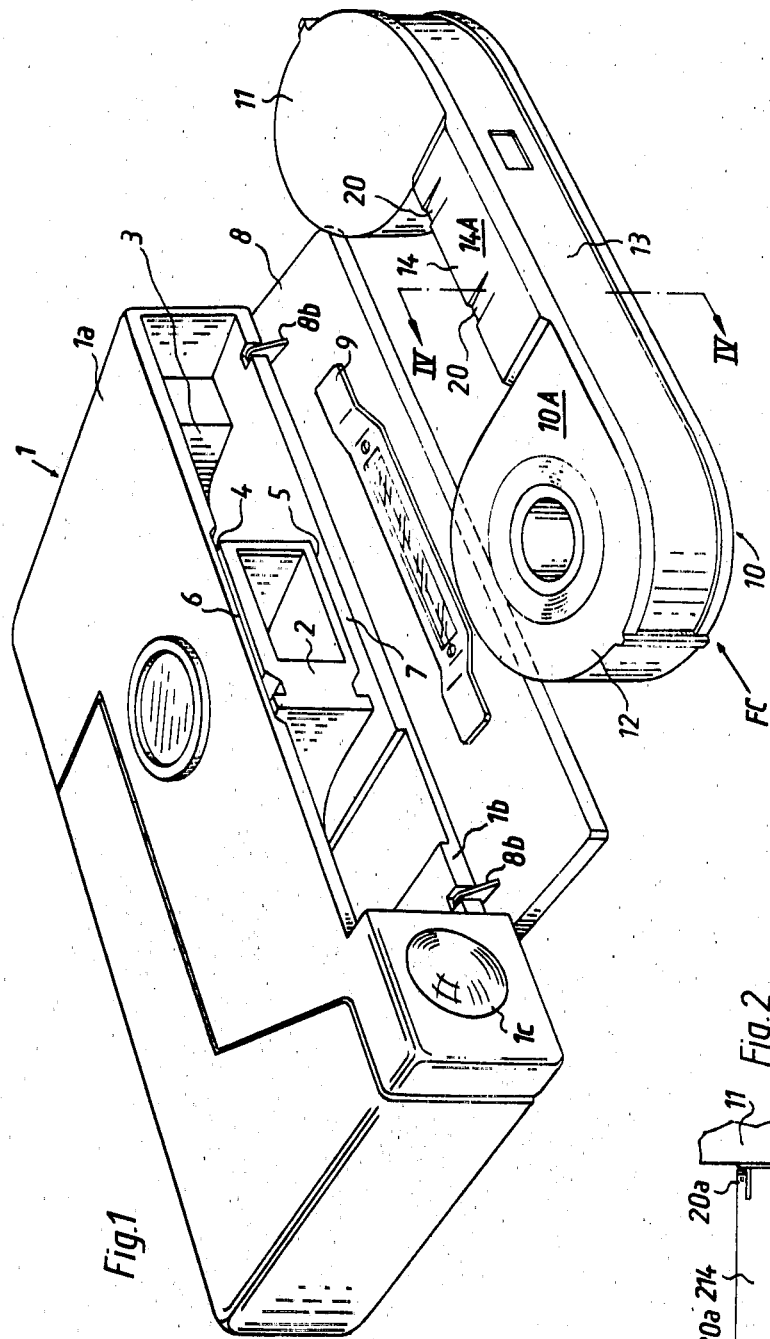
FIG. 1 is a perspective view of a film container which embodies one form of the invention, and further showing a photographic apparatus having a chamber which can receive the container.
Figure 4:
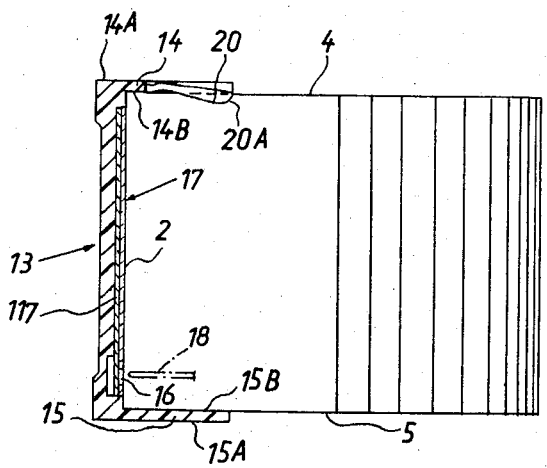
FIG. 4 is an enlarged sectional view, as seen in the direction of arrows from the line IV—IV of FIG. 1, further indicating the position of the film gate with respect to the intermediate section of the container.
Figure 5:
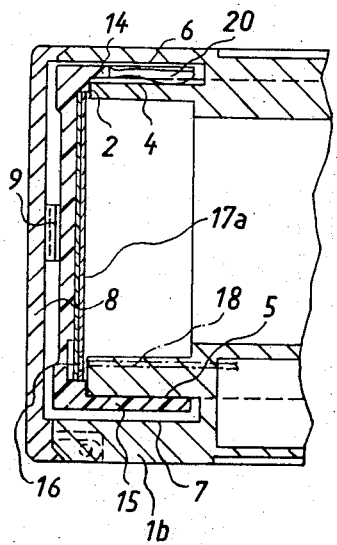
FIG. 5 is a sectional view similar to that of FIG. 4 but further showing in section that portion of the photographic apparatus of FIG. 1 which receives the intermediate section of the container when the latter is properly received in the chamber of the camera body.

Referring first to FIGS. 1, 4 and 5, there is shown a still camera having a housing or body 1 including a top wall 1a, a bottom wall 1b, a film gate 2 which is located behind the picture taking lens (not shown), a viewfinder 1c, and a cover or rear wall 8 which is pivotably connected to the rear edge of the bottom wall 1b by hinges 8b. When the rear wall 8 is moved to the closed position shown in FIG. 5, a suitably configurated leaf spring 9 at its inner side biases a properly inserted film container FC forwardly, i.e., toward the picture taking lens. The body 1 defines a chamber 3 for reception of a casing 10 forming part of the container FC.

The camera body 1 is provided with several internal surfaces including a first internal surface 6 which is the inner side of the top wall 1a, a second internal surface 7 which is the inner side of the bottom wall 1b, a third internal surface 4 which is the top outer face of the gate 2, and a fourth internal surface 5 which is the bottom outer face of the gate 2. The surfaces 4–7 are normally exactly or substantially parallel to each other.

The casing 10 of the film container FC comprises a substantially round first section or supply section 11 which serves to store unexposed convoluted photographic roll film 17, a substantially round second or takeup section 12 which serves to confine the convolutions of exposed film 17, and an intermediate section 13 which extends between and is integral with the sections 11, 12. When the casing 10 is inserted into the chamber 3 of the camera body 1 and the cover or rear wall 8 is moved to the closed position of FIG. 5, the intermediate section 13 is biased by the two end portions of the leaf spring 9 so as to maintain the foremost unexposed film frame in the focal plane of the picture taking lens. The foremost unexposed film frame forms part of that portion 17a of the film 17 which is confined in the intermediate section 13. The front side of the intermediate section 13 is provided with a customary window which should register with the opening of the gate 2 and with the foremost unexposed film frame prior to the making of an exposure.

The intermediate section 13 has two parallel panels including a top panel 14 and a bottom panel 15. The top panel 14 has two accessible exposed surfaces 14A, 14B the former of which is the outer surface and the latter of which is the inner surface of the panel 14. Analogously, the panel 15 has two accessible or exposed surfaces 15A, 15B the former of which is the outer and the latter of which is the inner surface of the panel 15. The surfaces 14A, 15A are preferably parallel to each other and respectively form part of the two outer sides of the casing 10 (only the outer side 14A shown in FIG. 1). The outer side 10A is the top side, as viewed in FIG. 1, 4 or 5, and the other outer side is the underside of the casing 10.

When the casing 10 is inserted into the chamber 3, the panel 14 of the intermediate section 13 extends into the space or gap between the internal surfaces 4, 6 and the panel 15 then extends into the space or gap between the internal surfaces 5, 7 of the camera body 1. The surfaces 14A, 15A, 14B, 15B are normal to the plane of the film portion 17a in the intermediate section 13 of the casing 10. The film 17 has a row of perforations 16 which are adjacent to its lower marginal portion, as viewed in FIG. 4 or 5, and the camera body 1 contains a mobile feeler or scanning element 18 which normally bears against the inner side of the film portion 17a and penetrates into an oncoming perforation 16 to thereby initiate the stoppage or an interruption of operation of the film transporting mechanism (not shown) at the exact time when the foremost unexposed frame of the film portion 17a is in register with the aforementioned window of the intermediate section 13 and with the opening of the film gate 2. Such penetration of the feeler 18 into an oncoming perforation 16 can take place only if the casing 10 is properly inserted into the chamber 3, as considered in a vertical direction (FIGS. 4 or 5), i.e., when the casing 10 is properly positioned in a manner to insure that the internal surfaces 4-7 of the camera body 1 are properly spaced apart from (or engage with) the adjacent exposed surfaces 14A, 15A, 14B, 15B of the intermediate section 13.

If the photographic apparatus including the camera body 1 is not provided with any specially designed positioning means to insure that the internal surfaces 4-7 will engage with or that such internal surfaces will be located at a desired distance from the adjoining exposed surfaces 14B, 15B, 14A, 15A, the feeler 18 might still be able to bear against the front side of the film portion 17a but its tip might not register with the row of perforations 16 so that the feeler will be incapable of properly controlling the extent of film transport. As mentioned above, certain photographic apparatus are provided with springs or other locating or positioning means which are used in addition to the leaf spring 9 and serve to properly position a casing 10 in a direction as considered at right angles to the plane of the film portion 17a in the intermediate section 13. However, not all cameras which can take the film container FC are equipped with such additional springs and, therefore, if the chamber 3 is too large and the width of the gaps between the internal surfaces 4, 6 and 5, 7 is excessive, a casing 10 will not be in an optimum position with respect to the feeler 18 and/or certain other camera components in spite of the fact that the rear side of the intermediate section 13 will be properly engaged by the spring 9 and urged thereby against the rear face of the film gate 2. Thus, the spring 9 merely insures that the distance between the plane of the film portion 17a and the picture taking lens corresponds to an optimum distance; however, this spring cannot assist in or effect a proper positioning of exposed surfaces 14A, 14B, 15A, 15B with respect to the internal surfaces 4-7 and hence an optimum register of the row of perforations 16 with the feeler 18.

In accordance with a feature of the invention, the film container FC is provided with its own means for insuring an optimum positioning of the row of perforations 16 relative to the feeler 18 when the casing 10 is inserted into the chamber 3 and the cover 8 is moved to the closed position of FIG. 5. Such means for insuring an optimum positioning of the row of perforations 16 achieves this by guaranteeing an optimum positioning of the external surfaces 14B, 15B, 14A, 15A with respect to the internal surfaces 4, 5, 6, 6 in the camera body 1. In the embodiment of FIGS. 1, 4 and 5, the film container FC is provided with two elastic projections 20 in the form of flaps or prongs which are integral with the top panel 14 of the intermediate section 13. When the casing 10 is not inserted into the chamber 3, the undersides of the flaps 20 extend downwardly beyond the surface 14B to an extent which is needed to insure that the flaps will engage the internal surface 4 (i.e., the top face of the gate 2) when the casing 10 is introduced into the camera body 1. The flaps 20 are deformed in response to engagement with the internal surface 4 and thereby bias the surface 15B against the internal surface 5, i.e., against the lower outer face of the film gate 2. It will be noted that the surface 15B is closely adjacent to the row of perforations 16 at the lower marginal portion of the film 17, as viewed in FIG. 4 or 5, so that, by causing the flaps 20 to urge the surface 15B against the adjacent internal surface 5, the flaps 20 are most likely to insure an accurate alignment of the feeler 18 with the perforations 16. The feeler 18 is normally mounted in the body 1 with a high degree of accuracy, and the same applies for the machining or finish of the internal surfaces 4 and 5; therefore, by causing the flaps 20 to bear against one (4) of the internal surfaces 4, 5, and to thereby urge the corresponding exposed surface 15B against the other (5) of these internal surfaces, I reduce the likelihood of misalignment of the feeler 18 with the row of perforations 16 to a minimum. It is clear that the flaps 20 could be provided on the panel 15 to bias the exposed surface 14B against the internal surface 4. The arrangement of FIGS. 1, 4 and 5 is preferred because the likelihood of misalignment between the feeler 18 and the row of perforations 16 is reduced still further if the exposed surface 15B which bears against the adjacent internal surface 5 of the camera body 1 is as close as possible to the feeler 18 and perforations 16.

The flaps 20 form integral parts of the panel 14 and hence of the casing 10. These flaps can be made by providing the panel 14 with two pairs of parallel slits shown in FIG. 1 and by bending the portions of the panel 14 between such pairs of slits inwardly, i.e., toward the surface 15B of the bottom panel 15. It is preferred to provide the leading or front edges of the flaps 20 with rounded lower front edges 20A (see FIG. 4) to thus insure that the flaps automatically find their way into the gap between the surfaces 4, 6 when the casing 10 is being inserted into the chamber 3. The flaps 20 are parallel to the optical axis of the camera when the casing 10 is received in the chamber 3.

FIG. 4 shows the intermediate section 13 in a position it assumes when the casing 10 is properly inserted into the chamber 3 and the cover 8 is closed to urge the front side of the section 13 (between the panels 14, 15) against the rear face of the film gate 2. The undeformed position of one of the flaps 20 is shown by broken lines and the deformed position by solid lines. Such deformation of the flaps 20 is due to engagement with the internal surface 4 (i.e., with the top outer face of the gate 2). Consequently, the flaps 20 tend to move the intermediate section 13 upwardly with respect to the film gate 2 so that the exposed surface 15B (i.e., the inner surface of the panel 15) bears against the internal surface 5 (i.e., against the bottom outer face of the gate 2). This insures that the feeler 18 (shown in FIG. 4 by phantom lines) is in exact register with the row of perforations 16 in the film portion 17a.

The layer 117 of sheet material between the film portion 17a and the rear panel of the intermediate section 13 in FIGS. 4 or 5 is a customary backing paper for the photographic roll film 17. FIG. 5 shows that the flaps 20 can properly position the casing 10 with respect to the camera body 1 even if the width of the gaps between the internal surfaces 4, 6 and 5, 7 greatly or substantially exceeds the thickness of the panels 14, 15 so that, in the absence of flaps 20, the intermediate section 13 could assume a large number of positions in which the feeler 18 would not be in exact alignment with the row of perforations 16. The flaps 20 position the casing 10 in a direction at right angles to the direction of film transport, and the leaf spring 9 positions the casing 10 at an optimum distance from the picture taking lens.

Figure 2:
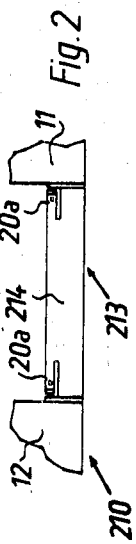
FIG. 2 is a smaller-scale fragmentary plan view of a slightly modified container.

FIG. 2 shows a portion of a modified casing 210 wherein the elastic flaps or projections 20a in the top panel 214 of the intermediate section 213 extend in parallelism with the longitudinal direction of the film portion in the section 213, i.e., at right angles to the optical axis when the casing 210 is inserted into the chamber 3. These flaps can function just as well as the flaps 20 of FIG. 1. The only important difference is that the flaps 20 are less likely to be broken off or excessively deformed in response to insertion of the casing 10 into the camera body 1.

Figure 3:
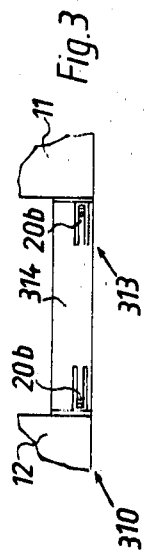
FIG. 3 is a similar fragmentary plan view of a third container.

FIG. 3 shows a portion of a casing 310 whose intermediate section 313 has a top panel 314 provided with two elastic projections or flaps 20b which are similar to the flaps 20a of FIG. 2 but are not provided in the leading edge of the top panel 314. The flaps 20b engage the internal surface 4 shortly before the rear panel of the intermediate section 313 reaches the rear face of the film gate 2. In each instance, the leading edges of the flaps are preferably rounded or bevelled or chamfered to reduce the likelihood of breakage in response to engagement with the film gate 2.

Figure 6:
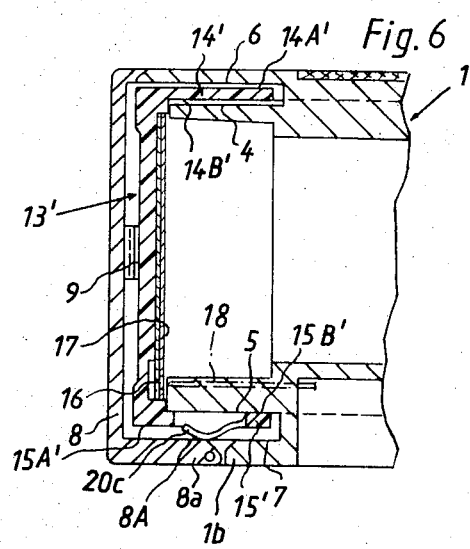
FIG. 6 illustrates the structure of FIG. 5 but with a container including a different intermediate section whose projection or projections engage the movable cover of the camera body.

FIG. 6 shows the photographic apparatus of FIG. 1 in the view of FIG. 5 and a slightly modified film container whose casing has an intermediate section 13' with panels 14', 15' and surfaces 14A', 14B', 15A', 15B'. The elastic projections or flaps 20c are provided on the panel 15' and normally extend downwardly beyond the surface 15A' to bear against the internal surface 7 when the casing including the section 13' is inserted into the camera body 1. In the embodiment of FIG. 6, the illustrated flap 20c actually bears against the internal surface 8A of the bottom portion 8a of the cover 8; however, it is clear that the flap 20c can bear against the internal surface 7 or that the panel 15' may have two, three or more elastic flaps 20c one or more of which bear against the internal surface 8A and one or more of which bear against the internal surface 7. When the cover 8 is held in the closed position of FIG. 6, the internal surface 8A can be considered an extension of the internal surface 7.

Since the flap or flaps 20c bear against the internal surface 8A and/or 7, they cause the surface 15B' to bear against the internal surface 5, the same as when using the elastic flaps 20, 20a or 20b. It is also possible (but normally not necessary) to use the flaps 20c together with the flaps 20, 20a and/or 20b. As shown in FIG. 6, the free end of the flap 20c extends rearwardly, i.e., in a direction toward the rear panel of the intermediate section 13'; this is desirable in order to reduce the likelihood of damage to the flap 20c during insertion of the casing including the section 13' into the camera body 1.

Though the flap 20c is also rounded or curved at its free rear end, such configuration is less important in connection with this flap than in connection with a flap 20 whose free end is its leading end, as considered in the direction of insertion of the casing into the chamber 3. Instead of making the leading portions of the flaps 20 rounded (as at 20A), it is equally possible to provide such leading portions with suitably inclined flat cam faces. The same applies for the leading edges of the flaps 20a, 20b shown in FIGS. 2 and 3. It has been found that the flaps are less likely to be damaged, excessively deformed or broken off if they are bent inwardly in a manner as shown in FIGS. 1–5 rather than outwardly as shown in FIG. 6.

An important advantage of the improved film container is that it can be used in many makes of cameras which cannot accept many presently known film containers because the positioning of known containers in the internal chambers of such makes of cameras is much too indefinite to allow for the making of satisfactory exposures.

It is further clear that the improved container can be used for storage of motion picture film, for example, 8-millimeter motion picture film. The casing of a container for motion picture film need not have a discrete intermediate section, such as the intermediate section 13 of the casing 10. The elastic projections are then provided on or attached to one outer side of the casing for motion picture film to act not unlike the flap 20c shown in FIG. 6. All that counts is to provide a container for motion picture film or still camera film with a casing having one or more elastic locating means which compensate for eventual tolerances in the machining or finish of internal surfaces of the camera body and/or the machining or finish of exposed surfaces of the casing. It is not necessary, that the elastic projection or projections urge a selected exposed surface of the casing against a portion of the film gate because the selected exposed surface of the casing can also bear against the internal surface of a wall of the camera body. For example, if the flap 20c of FIG. 6 were to bear against the internal surface 5, it could urge the surface 15A' against the internal surface 7 and/or the surface 14B' against the surface 4.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. A container for a supply of photographic roll film for use in photographic apparatus of the type having a chamber for reception of the container and bounded by a plurality of internal surfaces, said container comprising a casing including a first section for the storage of unexposed film and a second section for the storage of exposed film whereby a portion of said supply of film extends between said sections and is located in a predetermined plane, said casing further having an exposed surface which is at least substantially normal to said plane and said container further comprising at least one elastic portion arranged to engage and to be deformed by one of said internal surfaces of a photographic apparatus whose chamber receives said container and to thereby urge said exposed surface against another of said internal surfaces.

2. A container as defined in claim 1, wherein said casing further comprises an intermediate section extending between said first and second sections, said exposed surface being provided on said intermediate section and said portion of said supply of film being confined in said intermediate section.

3. A container as defined in claim 1, wherein said casing has two substantially parallel outer sides and said exposed surface forms part of or is parallel to one of said outer sides.

4. A container as defined in claim 1, wherein said elastic portion is a projection which is integral with said casing.

5. A container as defined in claim 1, wherein said supply of film as a row of perforations adjacent to one marginal portion thereof, said exposed surface being adjacent to said one marginal portion.

6. A container as defined in claim 1, wherein said casing has two substantially parallel exposed surfaces and said elastic portion is provided in the region of one of said exposed surfaces to bias the other of said exposed surfaces against said other internal surface while engaging with said one internal surface.

7. A container as defined in claim 6 for use in a photographic apparatus having a film gate including parallel first and second outer faces which respectively constitute said one and said other internal surface, said supply of film having a row of perforations adjacent to one marginal portion thereof and said other exposed surface being adjacent to said one marginal portion.

8. A container as defined in claim 7, wherein said casing has two substantially parallel outer sides and each of said exposed surfaces is parallel with or forms part of a different outer side.

9. A container as defined in claim 7, wherein said casing further comprises an intermediate section for said portion of photographic film, said intermediate section having two substantially parallel panels and said exposed surfaces constituting the inner surfaces of said panels.

10. A container as defined in claim 1 for use in a photographic apparatus having a film gate including parallel first and second outer faces one of which constitutes said other internal surface, said supply of film having a row of perforations adjacent to one marginal portion thereof and said exposed surface being adjacent to said one marginal portion.

11. A container as defined in claim 10, wherein said casing further comprises an intermediate section for said portion of photographic film and said section includes a panel having an inner surface constituting said exposed surface and a outer surface, said elastic portion being provided in the region of said outer surface and being arranged to bias said inner surface against said one outer face of the film gate while engaging with and being deformed by said one internal surface.

* * * * *